United States Patent
Kasagi

(10) Patent No.: US 12,511,536 B2
(45) Date of Patent: Dec. 30, 2025

(54) COMPUTER-READABLE RECORDING MEDIUM STORING ANALYSIS PROGRAM, ANALYSIS METHOD, AND INFORMATION PROCESSING DEVICE

(71) Applicant: FUJITSU LIMITED, Kawasaki (JP)

(72) Inventor: Akihiko Kasagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1013 days.

(21) Appl. No.: 17/563,055

(22) Filed: Dec. 28, 2021

(65) Prior Publication Data

US 2022/0300806 A1   Sep. 22, 2022

(30) Foreign Application Priority Data

Mar. 16, 2021   (JP) .................. 2021-042573

(51) Int. Cl.
  *G06N 3/08* (2023.01)
  *G06F 18/21* (2023.01)
  *G06F 18/25* (2023.01)
  *G06N 3/045* (2023.01)

(52) U.S. Cl.
  CPC ............ *G06N 3/08* (2013.01); *G06F 18/217* (2023.01); *G06F 18/25* (2023.01); *G06N 3/045* (2023.01)

(58) Field of Classification Search
  CPC ........ G06N 3/08; G06N 3/045; G06F 18/217; G06F 18/25
  USPC ............................................. 706/15
  See application file for complete search history.

(56) References Cited

U.S. PATENT DOCUMENTS

| | | | |
|---|---|---|---|
| 2009/0164475 A1* | 6/2009 | Pottenger | G06F 16/958 |
| 2013/0132310 A1 | 5/2013 | Lespinats et al. | |
| 2015/0120624 A1* | 4/2015 | Yokono | G06V 10/776 706/12 |
| 2016/0381498 A1* | 12/2016 | Bar-Shalom | H04W 4/02 455/456.1 |
| 2017/0149813 A1* | 5/2017 | Wright | H04L 63/1416 |
| 2017/0230394 A1 | 8/2017 | Kohlenberg et al. | |
| 2017/0372023 A1 | 12/2017 | Krasik et al. | |

FOREIGN PATENT DOCUMENTS

JP   2013-520714 A   6/2013

OTHER PUBLICATIONS

Snapshot Ensembles: Train 1, Get M or Free, Huang (Year: 2017).*

* cited by examiner

*Primary Examiner* — Austin Hicks
(74) *Attorney, Agent, or Firm* — XSENSUS LLP

(57) ABSTRACT

A non-transitory computer-readable recording medium storing an analysis program that causes a computer to execute a process, the process includes combining an artificial intelligence (AI) system with a plurality of deep learning models; and creating accuracy reference information for the plurality of deep learning models in a space in which accuracy evaluation information is projected in multiple dimensions, by using discrete threshold value evaluations, for the AI system.

9 Claims, 10 Drawing Sheets

COMPUTER-READABLE RECORDING MEDIUM STORING ANALYSIS PROGRAM, ANALYSIS METHOD, AND INFORMATION PROCESSING DEVICE

CROSS-REFERENCE TO RELATED APPLICATION

This application is based upon and claims the benefit of priority of the prior Japanese Patent Application No. 2021-042573, filed on Mar. 16, 2021, the entire contents of which are incorporated herein by reference.

FIELD

The embodiments discussed herein are related to an analysis program, an analysis method, and an information processing device.

BACKGROUND

Training of a deep learning model is usually performed using a learning data set including data for training and label information.

Furthermore, the recognition accuracy of the deep learning model after training is usually worked out using a data set for test including test data and label information. For example, inference made by the deep learning model with respect to the test data is compared with the label information, and the recognition accuracy is worked out from the correct answer rate of the inference.

In addition, since the deep learning model is a processing module using artificial intelligence (AI), it is possible to construct a system that combines a plurality of deep learning models (hereinafter referred to as an AI system).

For example, in recent years, a behavior estimation system that estimates a variety of kinds of human behavior from videos by combining a plurality of processing modules (deep learning models) has been achieved. This behavior estimation system is configured by, for example, combining processing modules for human recognition, posture recognition, tracking, and behavior estimation. Then, among these processing modules, the human recognition and the posture recognition are achieved by the deep learning models.

In the human recognition, an object recognition model specifies a person from one frame in a moving image. Furthermore, in the posture recognition, the posture of the person specified by the human recognition is specified by a posture recognition model. Thereafter, the AI system represents the specified posture of the person in a chronological manner in the tracking and estimates the behavior contents in the behavior estimation. A user evaluates whether the estimation result by such an AI system is acceptable (OK) or not (NG).

In addition, a plurality of deep learning models used in such an AI system are trained separately from each other. For example, the plurality of processing modules (deep learning models) are not trained together as the whole AI system.

U.S. Patent Application Publication No. 2017/0230394, U.S. Patent Application Publication No. 2017/0372023, and Japanese National Publication of International Patent Application No. 2013-520714 are disclosed as related art.

SUMMARY

According to an aspect of the embodiments, a non-transitory computer-readable recording medium storing an analysis program that causes a computer to execute a process, the process includes combining an artificial intelligence (AI) system with a plurality of deep learning models; and creating accuracy reference information for the plurality of deep learning models in a space in which accuracy evaluation information is projected in multiple dimensions, by using discrete threshold value evaluations, for the AI system.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
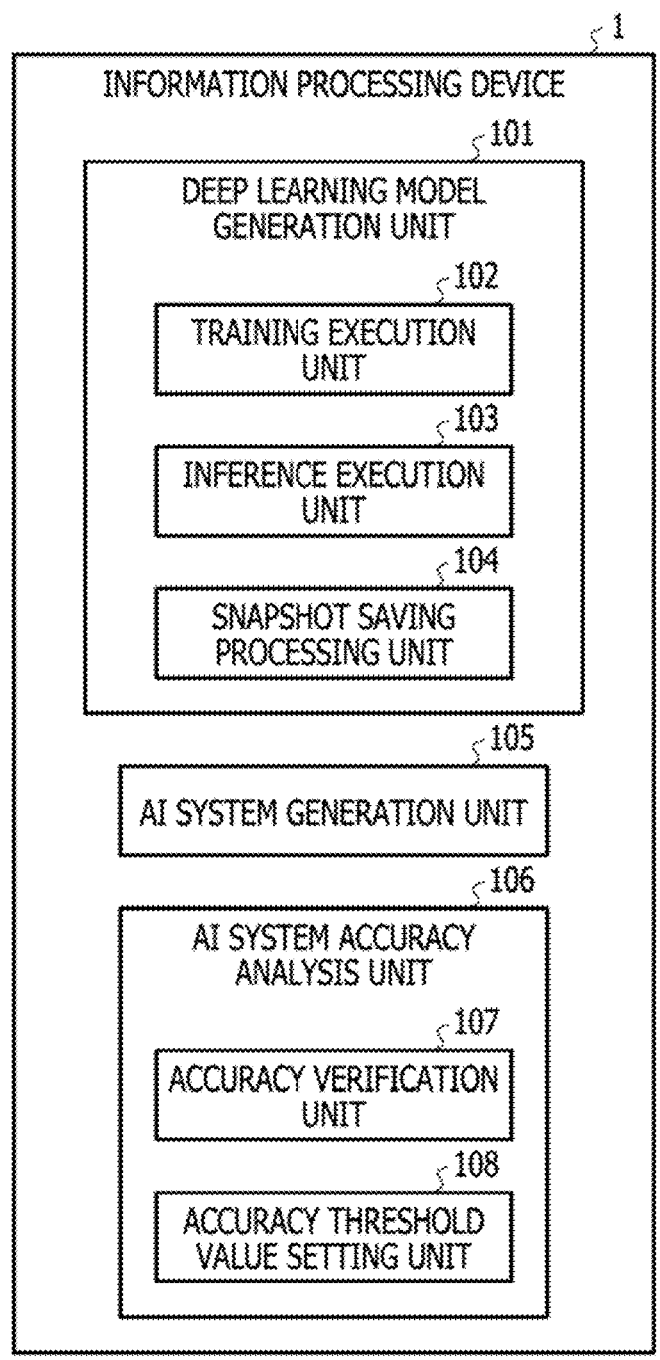
FIG. 1 is a diagram depicting a functional configuration of an information processing device as an example of an embodiment.

In the deep learning, a large amount of computation is needed to raise the accuracy. Furthermore, there is a large relationship between the accuracy of the deep learning and the computational resources needed for computation. For example, in the Residual Network (ResNet), which is a known neural network model, twice as many layers are needed to lower the error rate by 1%. Additionally, 1.5 times as many layers are employed to lower the error rate by 0.4% in some cases.

In an AI system that combines a plurality of deep learning models, if it is possible to exactly predict the minimum accuracy (or error rate) needed to train each deep learning model, the amount of computation may be significantly reduced. Then, by reducing the amount of computation, for example, the cost of the system may be reduced by, for example, replacing the needed computational resources with low-cost ones.

However, at the stage of training the deep learning models, it is difficult to deduce the influence of the accuracy of the individual deep learning model on the final accuracy of the AI system. For example, in the AI system that combines a plurality of deep learning models described above, the minimum degree accuracy expected for the deep learning models in order to allow the user to judge the estimation result of the AI system to be OK is not known, and the relaxation of the accuracy with respect to a threshold value, and the like may not be allowed to be examined. As a result, the accuracy of each deep learning model combined into the AI system is enhanced more than needed, which leads to excessive quality and causes the possibility of a rise in cost.

Hereinafter, embodiments of a technique capable of quantitatively analyzing the needed accuracy of a deep learning model combined into the AI system will be described with reference to the drawings. Note that the embodiments to be described below are merely examples, and there is no intention to exclude application of various modifications and techniques not explicitly described in the embodiments. For example, the present embodiments may be variously modified and implemented without departing from the spirit of the present embodiments. Furthermore, each drawing is not intended to include only the constituent elements illustrated in the drawing and may include other functions and the like.

(A) Configuration

FIG. 1 is a diagram depicting a functional configuration of an information processing device 1 as an example of an embodiment. The information processing device 1 has a function of generating an AI system including a plurality of deep learning models and analyzing the accuracy of the deep learning models.

Figure 2:
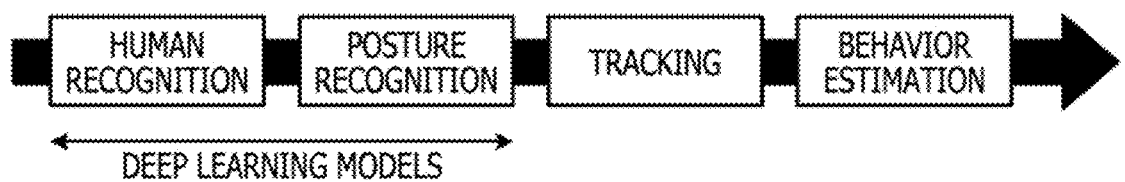
FIG. 2 is a diagram depicting an AI system generated by the information processing device as an example of the embodiment.

FIG. 2 is a diagram depicting an AI system generated by the information processing device 1 as an example of the embodiment. The AI system depicted in FIG. 2 is a behavior estimation system that estimates human behavior from input videos and is configured by combining four processing modules for human recognition, posture recognition, tracking, and behavior estimation. Furthermore, among these four processing modules, each of the processing modules for the human recognition and the posture recognition is achieved by the deep learning model.

In the human recognition, an object recognition model (first deep learning model) specifies a person from one frame in a moving image. Furthermore, in the posture recognition, a posture recognition model (second deep learning model) specifies the posture of the person specified by the human recognition. The AI system represents the specified posture in a chronological manner in the tracking and estimates the behavior contents in the behavior estimation. For the estimation result by such an AI system, the user inputs, for example, a two-choice (binary) evaluation of being acceptable (OK) or not (NG). The input of the evaluation by the user is made, for example, using a keyboard 15*a* and a mouse 15*b*, which will be described later in FIG. 10.

As illustrated in FIG. 1, the information processing device 1 includes a deep learning model generation unit 101, an AI system generation unit 105, and an AI system accuracy analysis unit 106.

The deep learning model generation unit 101 generates a plurality of types of deep learning models. The deep learning model generated by the deep learning model generation unit 101 is incorporated into the AI system and used.

In the present embodiment, an example in which the deep learning model generation unit 101 generates two types of deep learning models, namely, the object recognition model (first deep learning model) and the posture recognition model (second deep learning model), will be indicated. The deep learning model generation unit 101 has the functions of a training execution unit 102, an inference execution unit 103, and a snapshot saving processing unit 104.

The training execution unit 102 trains the deep learning model using training data. The training data may be data with label information. The training execution unit 102 generates a plurality of types (two types in the present embodiment) of deep learning models to be used in the AI system and trains these deep learning models using the training data.

For example, various approaches such as the convolutional neural network (CNN), recurrent neural networks (RNN), and long short-term memory (LSTM) method may be used to generate the deep learning models.

The training of the deep learning model is performed until, for example, the accuracy (validation accuracy) of the deep learning model worked out by the inference execution unit 103, which will be described later, becomes equal to or higher than a predetermined threshold value. Furthermore, the training may be performed until the number of repetitions (number of epochs) of the machine learning using the training data becomes equal to or higher than a predefined threshold value. It is desirable that the training execution unit 102 use the same test data to train the plurality of types of deep learning models.

The inference execution unit 103 makes an inference using the deep learning models generated and trained by the training execution unit 102. The inference execution unit 103 inputs test data to be inferred to the deep learning model and obtains an inference result output by the deep learning model.

Furthermore, the inference execution unit 103 calculates the accuracy (validation accuracy) of the inference result by comparing the inference result with the label information of the test data. Hereinafter, the accuracy of the estimation result of the deep learning model is sometimes simply referred to as the accuracy of the deep learning model.

The snapshot saving processing unit 104 stores a snapshot of the deep learning model generated by the deep learning model generation unit 101 in a model database (DB) (not illustrated). Information constituting the model DB is stored in, for example, a predetermined storage area of a storage device 13, which will be described later in FIG. 10, or the like.

The snapshot is information representing the deep learning model and may include, for example, Information regarding an intermediate layer constituting the deep learning model, and information on weights, activities, gradients, and the like obtained by training. The snapshot represents the deep learning model at the time point when the snapshot was created, and the deep learning model at the time point when the snapshot was created can be reproduced.

The snapshot saving processing unit 104 saves the snapshot of the deep learning model every time the accuracy of the deep learning model calculated by the inference execution unit 103 exceeds a predetermined threshold value (defined accuracy threshold value), for example.

In the present embodiment, for example, it is assumed that the defined accuracy threshold value in increments of 5% is set for the accuracy of the deep learning model. This makes it possible to obtain a plurality of deep learning models in which the accuracy of the deep learning models differs in increments of 5%.

Figure 3:
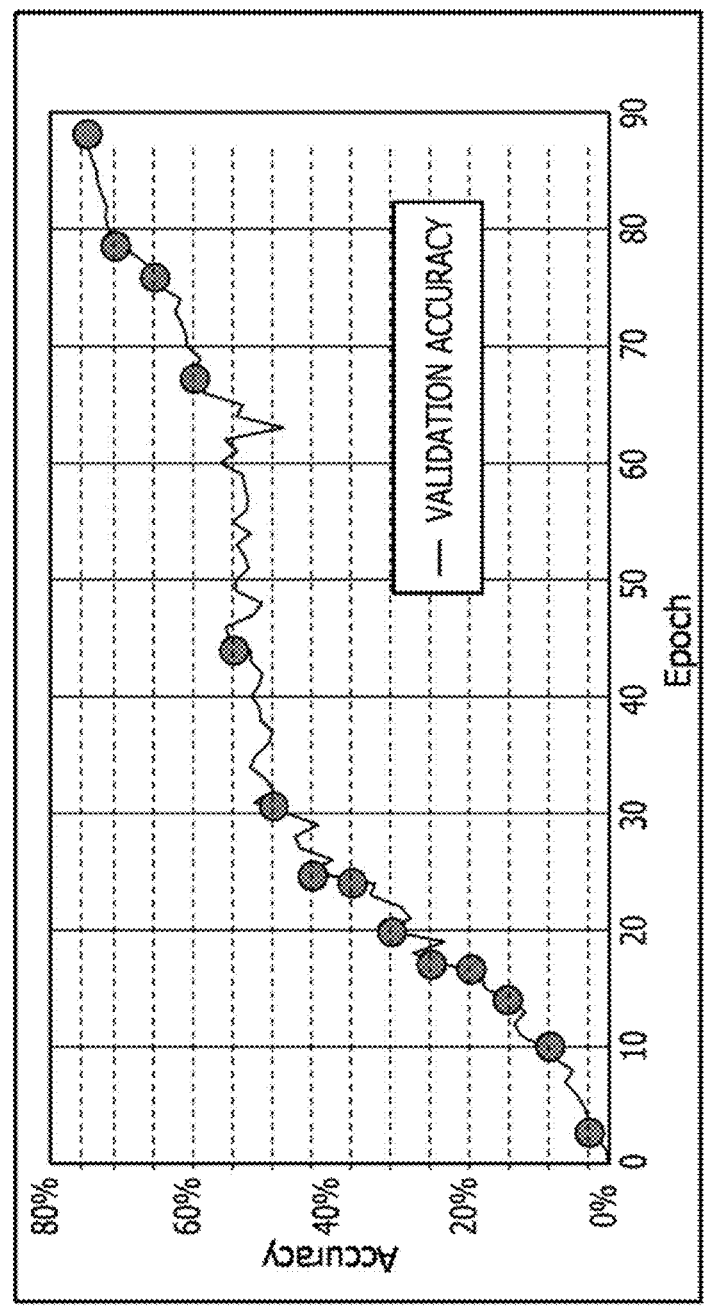
FIG. 3 is a diagram for explaining a snapshot acquired in the information processing device as an example of the embodiment.

FIG. 3 is a diagram for explaining the snapshot acquired in the information processing device 1 as an example of the embodiment. This FIG. 3 illustrates the relationship between the number of epochs of the object recognition model in the training course and the accuracy (validation accuracy) of the model, as a graph.

In this example illustrated in FIG. 3, the accuracy of the deep learning model improves as the number of training epochs increases. Furthermore, in FIG. 3, each of a plurality of shaded circles indicates the timing at which the snapshot is saved. This means that every time the accuracy of the deep learning model rises by 5%, the snapshot of the object recognition model is saved once. For example, every time the accuracy of the deep learning model becomes equal to or higher than the defined accuracy threshold value, the snapshot of the object recognition model is saved once. The snapshot saving processing unit 104 saves the snapshots discretely with the accuracy of the deep learning model. In addition, the snapshot saving processing unit 104 acquires the snapshots for each of the plurality of deep learning models.

By saving a snapshot (first snapshot) every time the accuracy of the object recognition model (first deep learning model) becomes equal to or higher than a unit threshold value in the training course of this object recognition model, the snapshot saving processing unit 104 creates a first snapshot group constituted by a plurality of first snapshots.

Furthermore, by saving a snapshot (second snapshot) every time the accuracy of the posture recognition model (second deep learning model) becomes equal to or higher than a unit threshold value in the training course of this posture recognition model, the snapshot saving processing unit 104 creates a second snapshot group constituted by a plurality of second snapshots.

For example, in regard to the AI system illustrated in FIG. 2, also for the posture recognition model, similarly to the object recognition model, the snapshot saving processing unit 104 saves the snapshot every time the accuracy of the deep learning model calculated by the inference execution unit 103 exceeds the defined accuracy threshold value (for example, 5%) in the training course of the posture recognition model.

The snapshot of the deep learning model during training is stored in the model DB together with information representing the accuracy at the timing when the snapshot was acquired.

The AI system generation unit 105 generates an AI system by combining a plurality of deep learning models generated by the deep learning model generation unit 101. The AI system generation unit 105 generates an AI system by combining a plurality of processing modules including the deep learning models, as depicted in FIG. 2, for example. The AI system generation unit 105 reproduces each of the deep learning models at each time point of when the snapshot was acquired, using a plurality of snapshots of each deep learning model saved by the snapshot saving processing unit 104.

Figure 4:
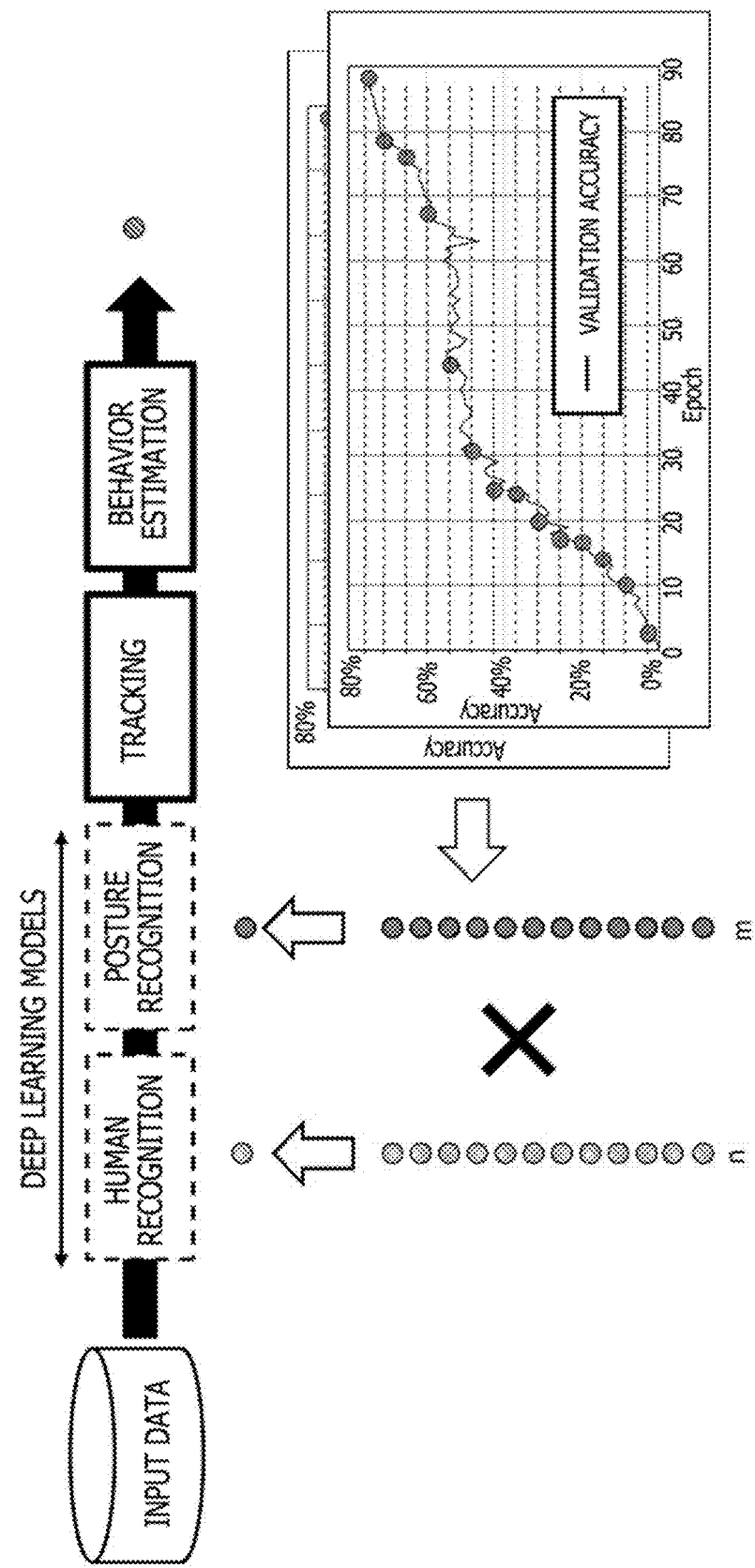
FIG. 4 is a diagram for explaining a process of an AI system generation unit in the information processing device as an example of the embodiment.

FIG. 4 is a diagram for explaining a process of the AI system generation unit 105 in the information processing device 1 as an example of the embodiment. In this FIG. 4, an approach for generating the AI system depicted in FIG. 2 is depicted.

The AI system generation unit 105 reproduces a plurality of (n) deep learning models (snapshot models) that achieve the human recognition, using a plurality of (n) snapshots (first snapshot group) acquired in the training course of the object recognition model. The symbol n denotes a natural number.

Furthermore, the AI system generation unit 105 reproduces a plurality of (m) deep learning models (snapshot models) that achieve the posture recognition, using a plurality of (m) snapshots (second snapshot group) acquired in the training course of the posture recognition model. The symbol m denotes a natural number.

Then, the AI system generation unit 105 generates a plurality of (n×m) types of AI systems by combining one deep learning model extracted from among this plurality of (n) deep learning models that achieve the human recognition, and one deep learning model extracted from among this plurality of (m) deep learning models that achieve the posture recognition. Hereinafter, the AI system configured by combining deep learning models in the training course is sometimes referred to as a sub-AI system.

The AI system generation unit 105 creates a plurality of sub-AI systems, in each of which the first snapshot extracted from the first snapshot group and the second snapshot extracted from the second snapshot group are combined, based on the first snapshot group and the second snapshot group.

For example, the AI system generation unit 105 combines one object recognition model selected from among a plurality of snapshots of the object recognition model, and one posture recognition model selected from among a plurality of snapshots of the posture recognition model, which have been saved by the snapshot saving processing unit 104, and constructs a sub-AI system that includes this combination. The AI system generation unit 105 constructs the sub-AI system in such a manner for all the combinations of the plurality of snapshots of the object recognition model and the plurality of snapshots of the posture recognition model, which have been saved by the snapshot saving processing unit 104.

The AI system accuracy analysis unit 106 analyzes the accuracy of the sub-AI system generated by the AI system generation unit 105. As illustrated in FIG. 1, the AI system accuracy analysis unit 106 has the functions as an accuracy verification unit 107 and an accuracy threshold value setting unit 108.

The accuracy verification unit 107 verifies the accuracy of each of the plurality of types of AI systems (sub-AI systems) generated by the AI system generation unit 105. For example, the accuracy verification unit 107 inputs input data (for example, image data) to each of the sub-AI systems generated by the AI system generation unit 105 and obtains inference results output by the sub-AI systems. The accuracy verification unit 107 presents the inference result of the sub-AI system to the user and accepts the input of an evaluation by the user for this inference result. The accuracy verification unit 107 presents the inference result to the user by displaying the inference result on a monitor 14a, which will be described later in FIG. 10, for example. The user inputs an evaluation for the inference result using an input device (refer to FIG. 10) such as the keyboard 15a or the mouse 15b.

The evaluation for the inference result is, for example, a binary judgment result (threshold value evaluation) representing whether or not the inference result by the sub-AI system is acceptable to the user. This judgment result may be referred to as accuracy evaluation information.

The user inputs "OK" when the inference result is acceptable and inputs "NG" when the inference result is unacceptable. Such an evaluation by the user for the inference result can be said to be a rough index representing the superiority or inferiority of the sub-AI system. Then, the evaluation by the user for the inference result functions as a threshold value acceptable with respect to an accuracy axis as the AI system.

The accuracy verification unit 107 stores the evaluation (OK or NG) by the user input for the estimation result of the sub-AI system in a predetermined storage area of a memory 12, the storage device 13, or the like, which will be described later in FIG. 10, in association with information regarding a plurality of deep learning models used in the configuration of the sub-AI system (for example, information on the snapshot of the object recognition model and information on the snapshot of the posture recognition model). The information on the snapshot may be the accuracy of the deep learning model at the timing when the snapshot was acquired.

The accuracy threshold value setting unit 108 sets an accuracy threshold value for verifying the accuracy of the AI system (AI system accuracy).

The accuracy of the deep learning model is derived from the correct answer rate with respect to the test data, and any deep learning model can be selected. Accordingly, it can be said that the accuracy of the deep learning model depends on the test data rather than the model of deep learning.

Then, the accuracy of the AI system including a plurality of such deep learning models can be expressed in a multidimensional space with the test data (one or more pieces for one deep learning model) as axes.

Figure 5:
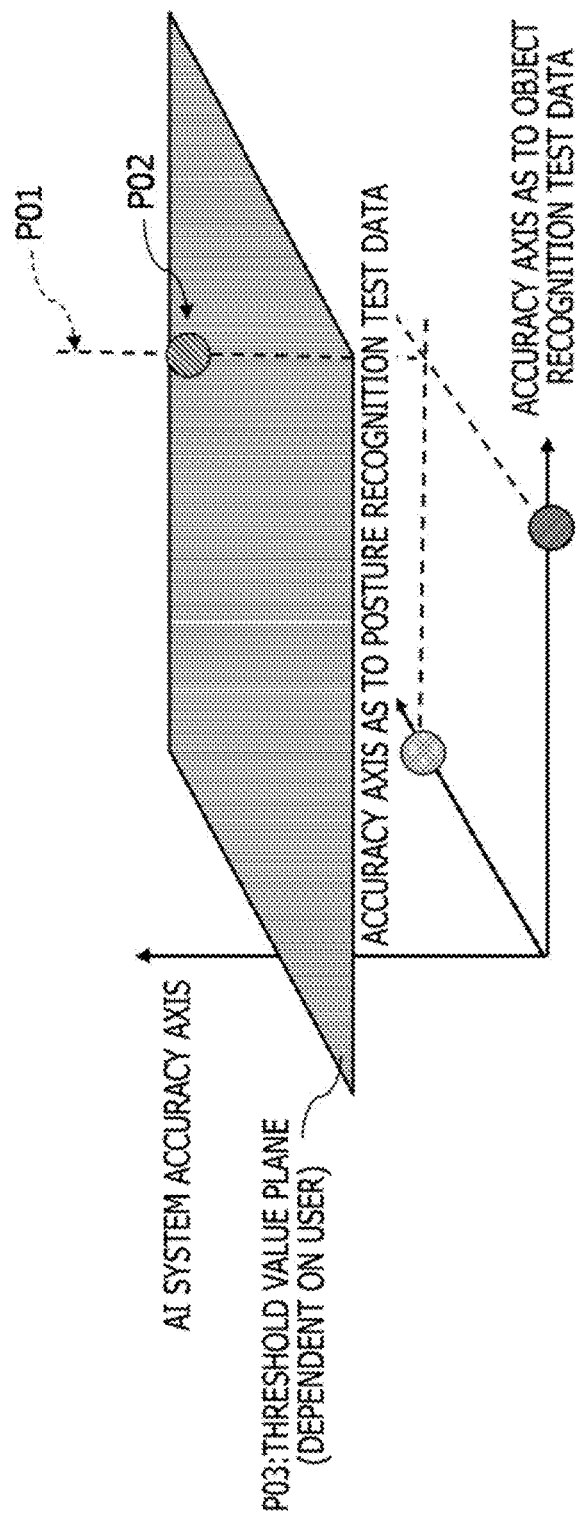
FIG. 5 is a diagram depicting a multidimensional space representing AI system accuracy.

FIG. 5 is a diagram depicting a multidimensional space representing the AI system accuracy. This multidimensional space depicted in FIG. 5 is constituted by an accuracy axis as to object recognition test data, an accuracy axis as to posture recognition test data, and an AI system accuracy axis. This multidimensional space is a space in which the accuracy evaluation information (the accuracy axis as to the object recognition test data and the accuracy axis as to the posture recognition test data) is projected in multiple dimensions.

In the multidimensional space depicted in FIG. 5, the evaluation for the inference of the AI system (sub-AI system) (refer to the reference sign P02 in FIG. 5) is indicated on a straight line passing through a point of the combination of the accuracy as to the object recognition test data and the accuracy as to the posture recognition test data and parallel to the AI system accuracy axis (refer to the reference sign P01 in FIG. 5). It can be said that this multidimensional space illustrated in FIG. 5 is a multidimensional space whose dimensional axes are respective pieces of the test data for each model of deep learning.

Furthermore, in this multidimensional space, a threshold value plane (refer to the reference sign P03 in FIG. 5), which is a reference for the evaluation by the user for the inference result of the AI system, can be virtually represented. For example, when the inference result is located above this threshold value plane, the inference result by the AI system is acceptable to the user (OK), and when the inference result is located at or below this threshold value plane, the inference result by the AI system is unacceptable to the user (NG).

Accordingly, rough information (a superior or inferior evaluation by the user) for the AI system may be estimated from the accuracy for the object recognition test data and the accuracy for the posture recognition test data.

Figure 6:
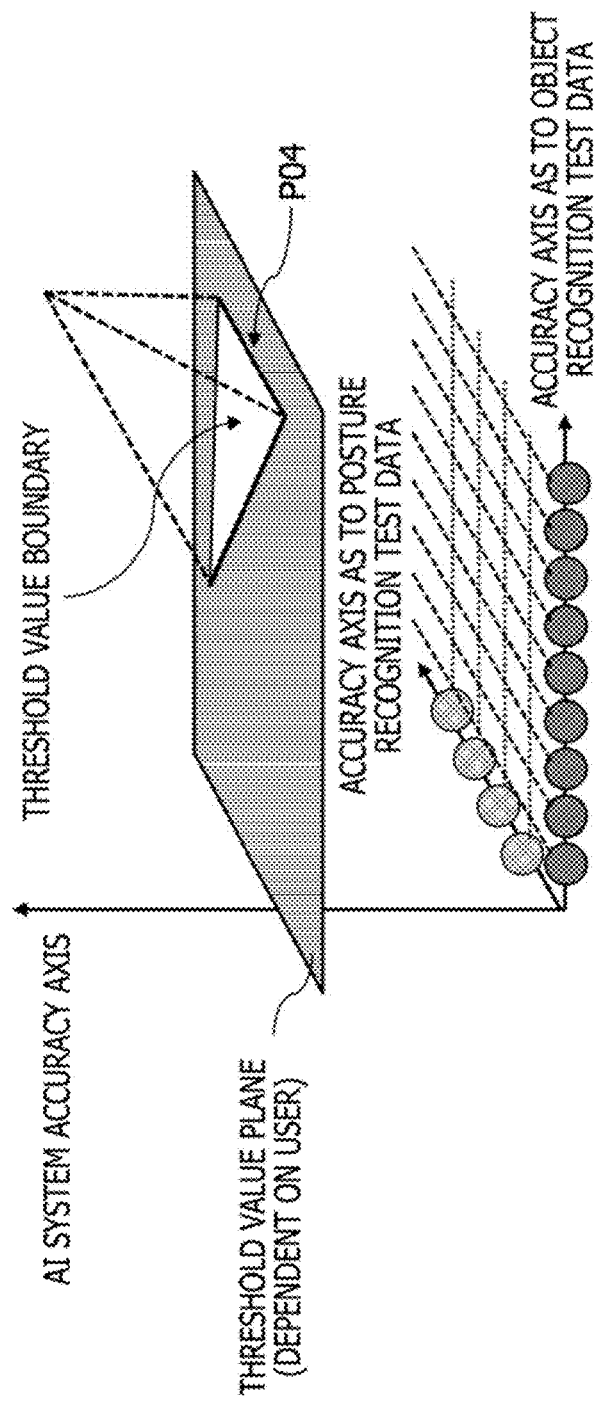
FIG. 6 is a diagram depicting a multidimensional space representing AI system accuracy.

FIG. 6 is a diagram depicting a multidimensional space representing the AI system accuracy. In the multidimensional space illustrated in FIG. 6, the evaluation (OK or NG) by the user for the estimation result of each sub-AI system acquired by the accuracy verification unit 107 is plotted as the accuracy of the sub-AI system in the multidimensional space depicted in FIG. 5, in correspondence with the information on the snapshot of the object recognition model and the information on the snapshot of the posture recognition model used in the configuration of the sub-AI system.

Here, the accuracy of the AI system enhances as the accuracy as to the object recognition test data enhances, and enhances as the accuracy as to the posture recognition test data enhances. Therefore, when the accuracy of the sub-AI system is plotted in a multidimensional space as indicated in FIG. 6, a right-angled triangular pyramid erected along the AI system accuracy axis is virtually formed with a plane formed by the accuracy axis as to the object recognition test data and the accuracy axis as to the posture recognition test data, as a bottom plane. In this right-angled triangular pyramid, a side parallel to the AI system accuracy axis (perpendicular line) is the side farthest from the AI system accuracy axis.

Then, by plotting each of evaluations related to the respective AI systems acquired by the AI system accuracy analysis unit 106 in the multidimensional space, a plurality of points representing the evaluations (OK) by the user for the estimation results of the AI systems are arranged on the threshold value plane. This plurality of points representing the evaluations (OK) by the user for the estimation results of the AI systems are arranged on a plane where the above-described right-angled triangular pyramid and the threshold value plane overlap. The plane where the virtual right-angled triangular pyramid representing the accuracy of the AI system and the threshold value plane overlap (refer to P04 in FIG. 6) represents a boundary plane of the threshold value for the evaluation by the user for the inference result of the AI system.

Hereinafter, in the example illustrated in FIG. 6, the triangle formed by the superimposition of the right-angled triangular pyramid representing the accuracy of the AI system on the threshold value plane is sometimes referred to as a threshold value boundary. In the multidimensional space depicted in FIG. 6, by referring to the accuracy axis as to the object recognition test data and the accuracy axis as to the posture recognition test data corresponding to the threshold value boundary, it is possible to grasp the accuracy as to the object recognition test data and the accuracy as to the posture recognition test data used in the configuration of a sub-AI system evaluated by the user to be OK, which are needed to obtain the accuracy of the sub-AI system.

For example, the threshold value boundary serves as a performance index for a plurality of deep learning models used in the configuration of a sub-AI system that satisfies the user's request and an index (accuracy reference information) for the accuracy as to the object recognition test data and the accuracy as to the posture recognition test data, which are needed to obtain the accuracy of the sub-AI system.

The accuracy threshold value setting unit 108 presents, to the user, the accuracy axis as to the object recognition test data and the accuracy axis as to the posture recognition test data, which correspond to the threshold value boundary in the multidimensional space, as reference information for setting the accuracy threshold value. This reference information may be presented by displaying the reference information on the monitor 14*a* (refer to FIG. 10), for example.

(B) Operation

An outline of an approach for constructing the AI system in the information processing device 1 as an example of the embodiment configured as described above will be described with reference to the flowcharts illustrated in FIGS. 7 and 8. Note that FIG. 7 is a flowchart indicating an outline of an approach for constructing the AI system (operations A1 to A4), and FIG. 8 is a flowchart indicating the details of the process in operation A2 (operations B1 to B15).

Figure 7:
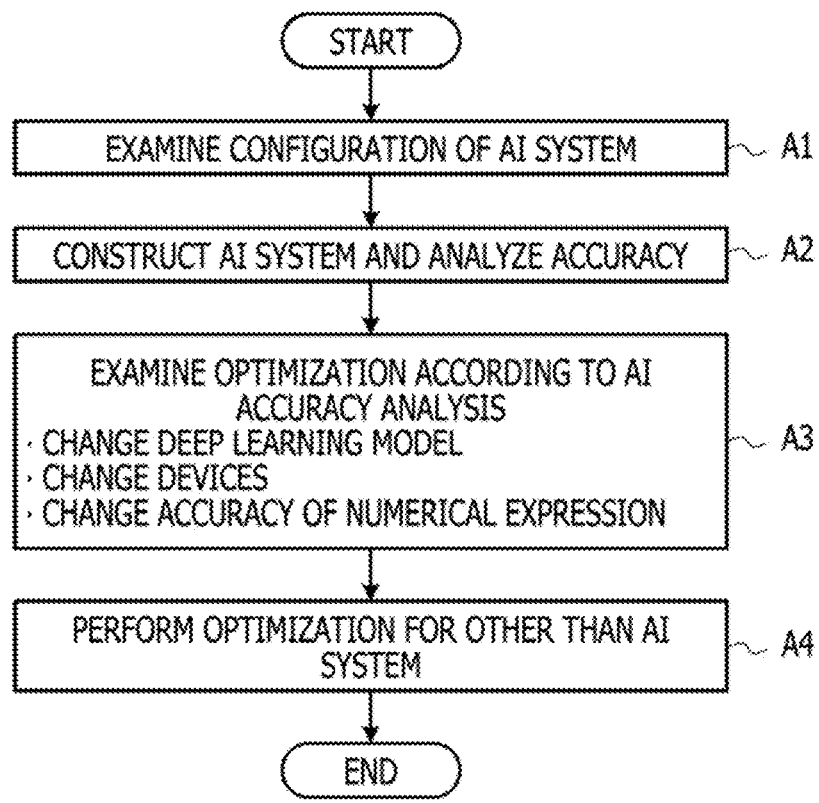
FIG. 7 is a flowchart for explaining an outline of an approach for constructing an AI system in the information processing device as an example of the embodiment.

In operation A1 in FIG. 7, the user examines the configuration of the AI system. For example, the user examines the deep learning model used in the configuration of the AI system, designates the number of epochs for training the deep learning model, and the like.

In operation A2 in FIG. 7, the AI system is constructed and the accuracy is analyzed. The details of the process in this operation A2 will be described with reference to the flowchart illustrated in FIG. 8.

Figure 8:
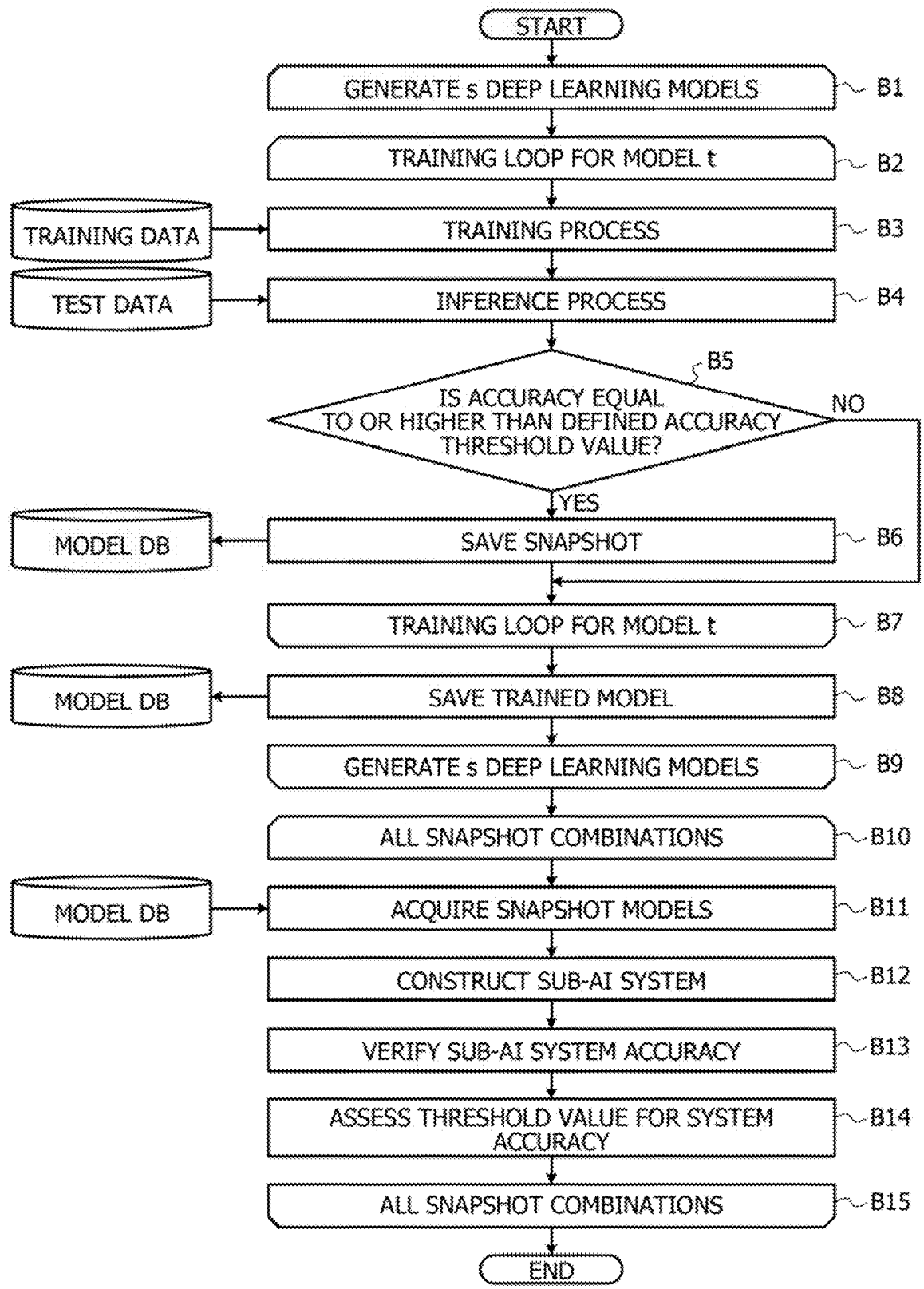
FIG. 8 is a flowchart for explaining an outline of an approach for constructing an AI system in the information processing device as an example of the embodiment.

In operation B1 in FIG. 8, a loop process is started in which control up to operation B9 in FIG. 8 is repeatedly conducted for a plurality of (s) deep learning models used in the AI system.

In operation 62 in FIG. 8, a loop process is started in which control up to operation B7 in FIG. 8 is repeatedly conducted until the number of loops t performed in the training for the deep learning model is reached.

In operation 83 in FIG. 8, the training execution unit 102 trains the deep learning model using the training data.

In operation 64 in FIG. 8, the inference execution unit 103 inputs the test data to be inferred to the deep learning model and obtains an inference result output by the deep learning model.

In operation B5 in FIG. 8, the snapshot saving processing unit 104 determines whether or not the accuracy of the inference result acquired by the inference execution unit 103 is equal to or higher than a predetermined threshold value (defined accuracy threshold value).

As a result of this determination, when the accuracy of the inference result is equal to or higher than the defined accuracy threshold value (refer to the YES route in operation B5), in operation B6, the snapshot saving processing unit 104 saves the snapshot of the deep learning model. The snapshot (deep learning model) is saved in the model DB. Thereafter, the process shifts to operation B7 in FIG. 8.

On the other hand, as a result of the confirmation in operation B5, when the accuracy of the inference result is less than the defined accuracy threshold value (refer to the NO route in operation 65), operation B6 is skipped, and the process shifts to operation B7.

In operation B7, a loop end process corresponding to operation 62 is conducted. Here, when the training for the predefined number of loops t is completed for the deep learning model, the control proceeds to operation B8 in FIG. 8.

In operation B8, the deep learning model generation unit 101 causes the created trained deep learning model to be saved in the model DB.

In operation B9 in FIG. 8, a loop end process corresponding to operation B1 is conducted. Here, when the creation and training of all the s deep learning models have been completed, the control proceeds to operation B10 in FIG. 8.

In operation B10, a loop process is started in which control up to operation B15 in FIG. 8 is repeatedly executed for all combinations of snapshots saved for each of the s deep learning models.

In the present embodiment, the process is performed on two deep learning models (s=2), namely, the object recognition model and the posture recognition model. For example, a loop process is started in which control up to operation B15 in FIG. 8 is repeatedly executed for all combinations of a plurality of snapshots of the object recognition model and a plurality of snapshots of the posture recognition model saved by the snapshot saving processing unit 104.

In operation B11 in FIG. 8, the AI system generation unit 105 extracts one combination from among all the combinations of the plurality of snapshots of the object recognition model and the plurality of snapshots of the posture recognition model. Then, the AI system generation unit 105 acquires respective snapshot models relevant to this combination from the model DB.

In operation 812 in FIG. 8, the AI system generation unit 105 constructs a sub-AI system using the combination of the acquired snapshot models (the object recognition model and the posture recognition model).

In operation 813 in FIG. 8, the AI system accuracy analysis unit 106 (accuracy verification unit 107) verifies the accuracy of the sub-AI system generated by the AI system generation unit 105. For example, the AI system accuracy analysis unit 106 inputs input data (test data) for each of the sub-AI systems and obtains inference results output by the sub-AI systems. Then, the accuracy verification unit 107 presents the inference result of the AI system to the user and accepts the input of an evaluation by the user for this inference result.

In operation B14 in FIG. 8, the accuracy threshold value setting unit 108 assesses the threshold value set for the accuracy of the sub-AI system. In the multidimensional space, the accuracy threshold value setting unit 108 plots the evaluation (OK or NG) by the user for the estimation result of each sub-AI system acquired by the accuracy verification unit 107, as the accuracy of the sub-AI system, in correspondence with the information on the snapshot of the object recognition model and the information on the snapshot of the posture recognition model used in the configuration of the sub-AI system.

The accuracy threshold value setting unit 108 presents, to the user, the accuracy axis as to the object recognition test data and the accuracy axis as to the posture recognition test data, which correspond to the threshold value boundary in the multidimensional space, as reference information (accuracy reference information) for setting the accuracy threshold value.

In operation B15 in FIG. 8, a loop end process corresponding to operation B10 is conducted. Here, when the process for combinations of all the snapshots is completed, the process shifts to operation A3 in FIG. 7.

In operation A3, optimization is examined based on the result of the accuracy analysis for the AI system performed in operation A2. For example, changing the deep learning model used in the AI system to another deep learning model, changing the devices (the processor and the memory) used for arithmetic operations, changing the accuracy of numerical expression, and the like are examined. Such examination for optimization may be performed by the user or may be achieved by the information processing device 1 in accordance with a predefined rule.

Thereafter, in operation A4 in FIG. 7, optimization is performed from a viewpoint other than the AI system, and the process ends.

(C) Effects

As described above, according to the information processing device 1 as an example of the embodiment, for each of a plurality of types of deep learning models used in the AI system, the snapshot saving processing unit 104 saves the snapshot every time the accuracy of the deep learning model exceeds the defined accuracy threshold value in the training course of each deep learning model. This makes it possible to acquire a plurality of deep learning models (accuracy patterns) in which the accuracy with respect to the training data in the training course varies stepwise, for each deep learning model.

Furthermore, the AI system generation unit 105 generates a sub-AI system using a plurality of types of deep learning models generated by the deep learning model generation unit 101. Then, the AI system generation unit 105 constructs such a sub-AI system for all combinations of a plurality of snapshots of the respective deep learning models (for example, the object recognition model and the posture recognition model) between these respective deep learning models.

Then, by verifying the estimation result by the sub-AI system (inputting the evaluation by the user) for all the sub-AI systems including the combinations of this plurality of types of deep learning models, the plurality of deep learning models may be verified for all sorts of the accuracy patterns.

Furthermore, the accuracy threshold value setting unit 108 generates the threshold value boundary using the verification results for the accuracy of these all sorts of the AI systems, by plotting the evaluation results by the user in a multidimensional space having the test data for each model of deep learning as dimensions. By referring to this threshold value boundary and projecting the accuracy requested of the AI system by the user to the accuracy of each deep learning model with respect to the test data set, the target accuracy of each deep learning model that can achieve the AI system expected by the user may be clarified. This makes it possible to mitigate the excessive quality for the AI system and reduce the cost of computations, devices, and the like.

By referring to the threshold value boundary, the influence of the accuracy of each deep learning model on the final accuracy of the AI system may be grasped, and each deep learning model may be efficiently trained.

As an evaluation of the sub-AI system, the user only needs to return feedback of about a binary value such as OK or NG or true or false, for example, and does not need to input quantitative accuracy information. Even if the test data of the AI system has no label information, the accuracy of each of a plurality of deep learning models may be measured separately and quantitatively.

For example, the label information does not need to be prepared in the test data of the AI system, and a large cost for preparing the label information may be reduced.

Figure 9:
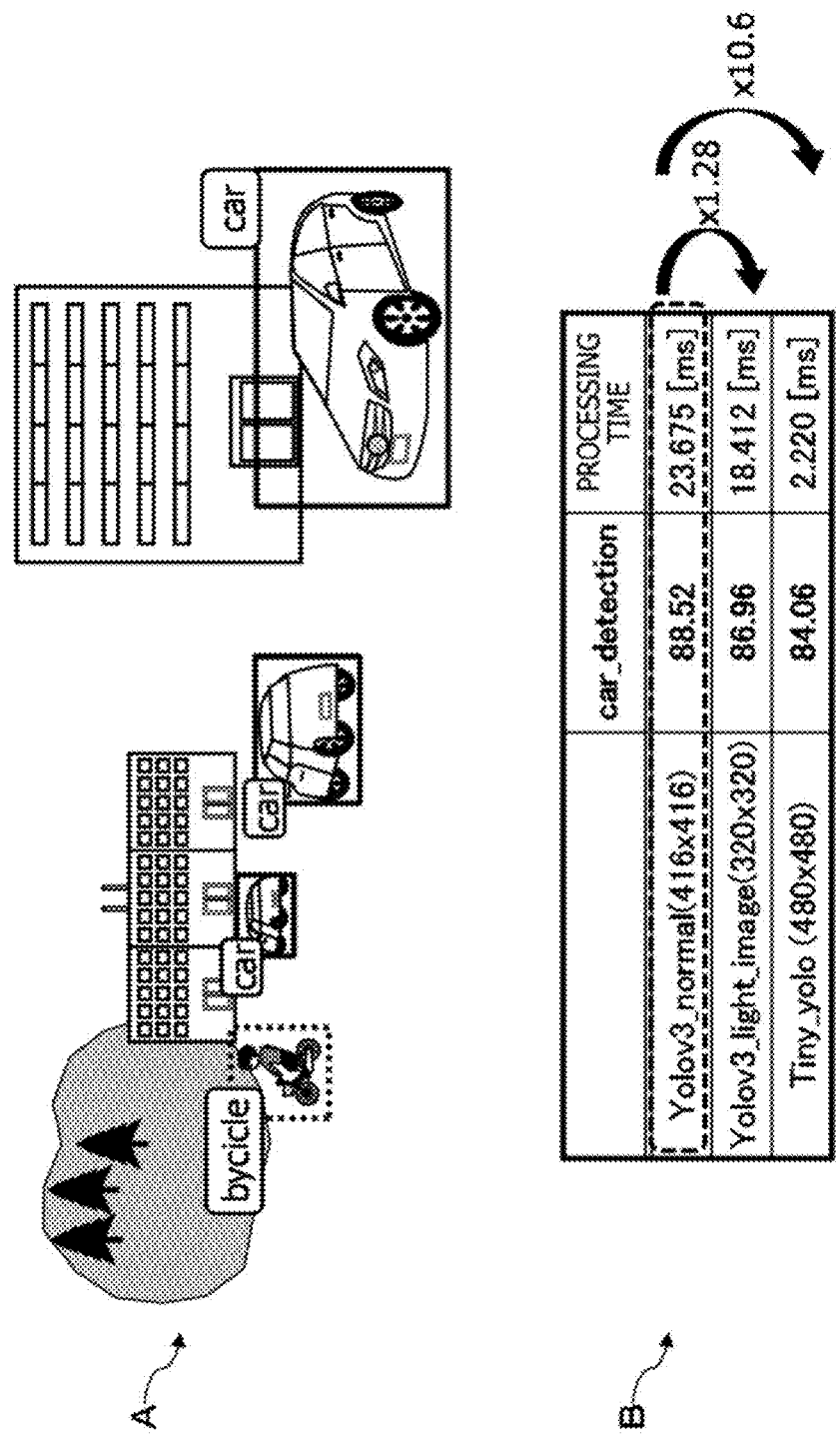
FIG. 9 is a diagram depicting an effect of an AI system generated by the information processing device as an example of the embodiment.

FIG. 9 is a diagram depicting an effect of an AI system generated by the information processing device 1 as an example of the embodiment. The example illustrated in FIG. 9 indicates an example of constructing an AI system that recognizes an object in an image. In FIG. 9, the reference sign A indicates an image as test data in which object recognition is performed, and the reference sign B depicts the relationship between a machine learning model, the recognition rate (car_detection), and the processing time.

When object recognition is performed on an image as depicted by the reference sign A, the processing time taken for object recognition fluctuates according to the recognition accuracy needed, for example, for the car. Usually, the smaller the car, the lower the accuracy because it is difficult to find. Therefore, "recognizable subject size" or the like may be given as a discrimination threshold value.

In the example indicated by the reference sign B, Yolov3_normal, Yolov3_light_image and Tiny_yolo are indicated as deep learning models (machine learning models) used for object recognition.

In regard to the recognition rate for the car with respect to the same test data, Yokov3_normal performs computation by a normal input image setting, and Yolov3_light_image performs computation by shrinking the input image to a smaller size. Furthermore, Tiny_yolo is another machine learning model different from Yolov3 and has a very light computation load.

As indicated by the reference sign B, as a result of performing car recognition with respect to the test data using Yolov3_normal, the processing time was 23.675 ms and the recognition rate (recognition accuracy) was 88.52%.

In addition, the result of performing car recognition with respect to the same test data using Yolov3_light_image was that the processing time was 18.412 ms and the recognition rate (recognition accuracy) was 86.96%. For example, it can be seen that the processing time performance is improved 1.28 times by permitting the recognition rate to be lowered by 1.56% for Yolov3_normal.

Furthermore, the result of performing car recognition with respect to the same test data using Tiny_yolo was that the processing time was 2.220 ms and the recognition rate (recognition accuracy) was 84.06%. For example, it can be seen that the processing time performance is improved 10.66 times by permitting the recognition rate to be lowered by 3.92% for Yolov3_normal.

In this manner, by precisely setting the accuracy threshold value expected for the deep learning model (machine learning model), a high improvement in processing time performance may be obtained.

In addition, in the example illustrated in FIG. 9, an example of changing the deep learning model (machine learning model) used for object recognition is indicated, but the present embodiment is not limited to this example. For example, the hardware configuration of a processor or the like that executes the deep learning model may be changed, and changes may be implemented as appropriate.

(D) Others

Figure 10:
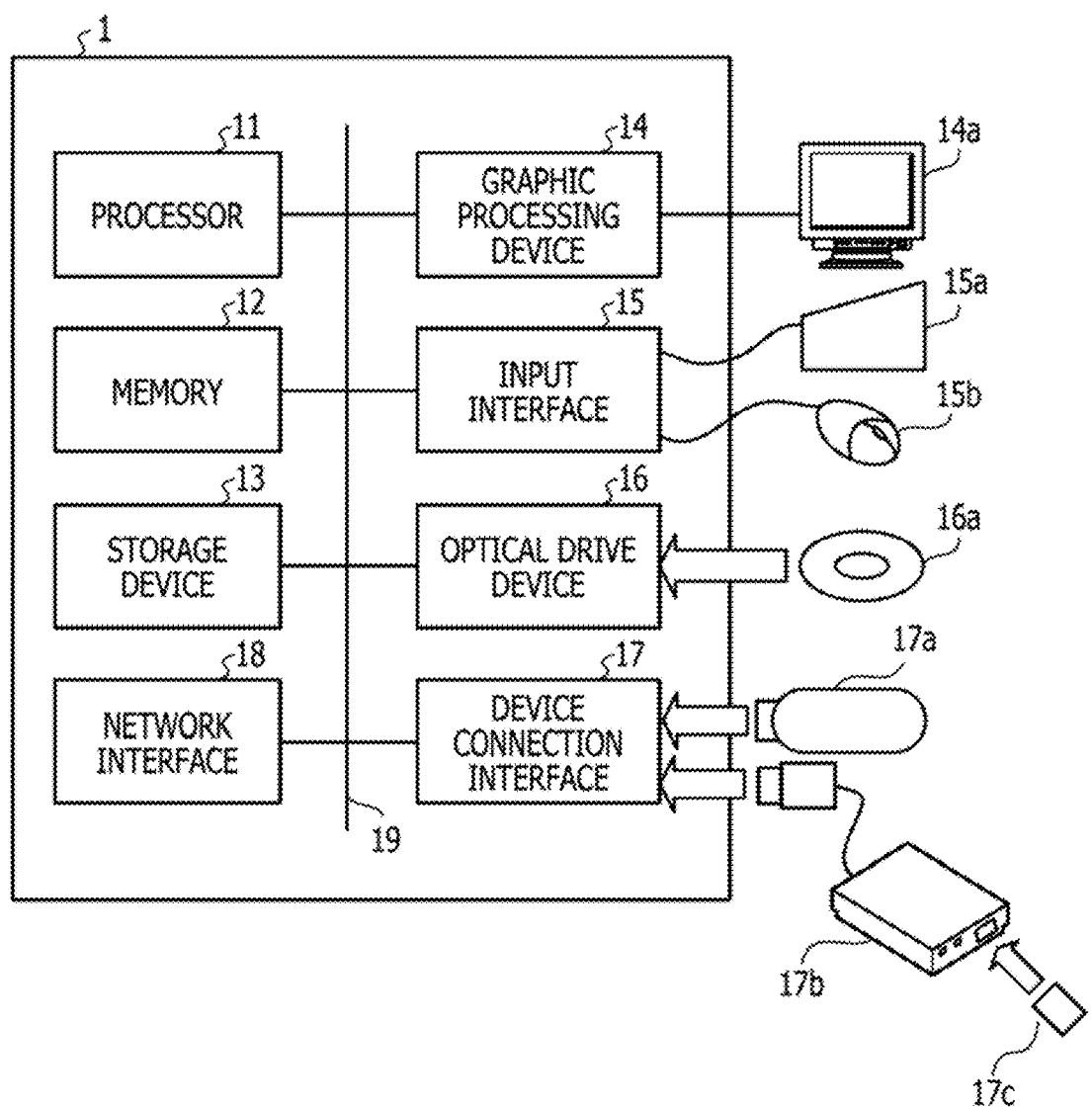
FIG. 10 is a diagram depicting a hardware configuration of the information processing device as an example of the embodiment.

FIG. 10 is a diagram depicting a hardware configuration of the information processing device 1 as an example of the embodiment.

The information processing device 1 is a computer and includes, for example, a processor 11, a memory 12, a storage device 13, a graphic processing device 14, an input interface 15, an optical drive device 16, a device connection interface 17, and a network interface 18 as constituent elements. These constituent elements 11 to 18 are configured such that communication with each other is enabled via a bus 19.

The processor (control unit) 11 controls the entire information processing device 1. The processor 11 may be a multiprocessor. The processor 11 may be, for example, any one of a central processing unit (CPU), a micro processing unit (MPU), a digital signal processor (DSP), an application specific integrated circuit (ASIC), a programmable logic device (PLD), and a field programmable gate array (FPGA). Furthermore, the processor 11 may be a combination of two or more types of elements of the CPU, MPU, DSP, ASIC, PLD, and FPGA.

Then, when the processor 11 executes a control program (an analysis program and a machine learning program: not illustrated) for the information processing device 1, the functions as the deep learning model generation unit 101, the AI system generation unit 105, and the AI system accuracy analysis unit 106 depicted in FIG. 1 are achieved.

Note that the information processing device 1 achieves the functions as the deep learning model generation unit 101, the AI system generation unit 105, and the AI system accuracy analysis unit 106, for example, by executing a program (a machine learning program and an operating system (OS) program) recorded in a computer-readable non-transitory recording medium. Furthermore, the information processing device 1 achieves the functions as the AI system generation unit 105 and the AI system accuracy analysis unit 106, for example, by executing a program (an analysis program and an OS program) recorded in a computer-readable non-transitory recording medium.

A program in which processing contents to be executed by the information processing device 1 are described may be recorded in a variety of recording media. For example, the program to be executed by the information processing device 1 may be stored in the storage device 13. The processor 11 loads at least a part of the program in the storage device 13 into the memory 12 and executes the loaded program.

Furthermore, the program to be executed by the information processing device 1 (processor 11) may be recorded in a non-transitory portable recording medium such as an optical disc 16a, a memory device 17a, or a memory card 17c. The program stored in the portable recording medium can be executed after being installed in the storage device 13, for example, under the control of the processor 11. In addition, the processor 11 is also capable of directly reading and executing the program from the portable recording medium.

The memory 12 is a storage memory including a read only memory (ROM) and a random access memory (RAM). The RAM of the memory 12 is used as a main storage device of the information processing device 1. The RAM temporarily stores at least a part of the program to be executed by the processor 11. Furthermore, the memory 12 stores various types of data needed for processes by the processor 11.

The storage device 13 is a storage device such as a hard disk drive (HDD), a solid state drive (SSD), or a storage class memory (SCM) and stores various kinds of data. The storage device 13 may store various types of data generated by the deep learning model generation unit 101, the AI system generation unit 105, and the AI system accuracy analysis unit 106, such as the training data, test data, and snapshots. In addition, the storage device 13 may store data constituting the model DB. The storage device 13 stores the OS program, the control program, and various types of data. The control program includes the analysis program and the machine learning program.

Note that a semiconductor storage device such as an SCM or a flash memory may also be used as an auxiliary storage device. Furthermore, redundant arrays of inexpensive disks (RAID) may be configured using a plurality of storage devices 13.

The graphic processing device 14 is connected to the monitor 14a. The graphic processing device 14 displays an image on a screen of the monitor 14a in accordance with a command from the processor 11. Examples of the monitor 14a include a display device using a cathode ray tube (CRT), and a liquid crystal display device.

The input interface 15 is connected to the keyboard 15a and the mouse 15b. The input interface 15 transmits signals sent from the keyboard 15a and the mouse 15b to the processor 11. Note that the mouse 15b is an example of a pointing device, and another pointing device may also be used. Examples of another pointing device include a touch panel, a tablet, a touch pad, and a track ball.

The optical drive device 16 reads data recorded in the optical disc 16a using laser light or the like. The optical disc 16a is a non-transitory portable recording medium having data recorded in a readable manner by reflection of light. Examples of the optical disc 16a include a digital versatile disc (DVD), a DVD-RAM, a compact disc read only memory (CD-ROM), and a CD-recordable (R)/rewritable (RW).

The device connection interface 17 is a communication interface for connecting peripheral devices to the information processing device 1. For example, the device connection interface 17 may be connected to the memory device 17a and a memory reader/writer 17b. The memory device 17a is a non-transitory recording medium equipped with a communication function with the device connection interface 17, such as a universal serial bus (USB) memory. The memory reader/writer 17b writes data to the memory card 17c or reads data from the memory card 17c. The memory card 17c is a card-type non-transitory recording medium.

The network interface 18 is connected to a network. The network interface 18 transmits and receives data via the network. Other information processing devices, communication devices, and the like may be connected to the network.

Then, the disclosed technique is not limited to the above-described embodiments, and various modifications may be made and implemented without departing from the spirit of the present embodiments. Each configuration and each process of the present embodiments may be selected or omitted as needed or may be appropriately combined.

For example, the above-described embodiments have indicated an example in which the AI system is a behavior estimation system that combines two types of deep learning models, namely, the object recognition model and the posture recognition model, but the present embodiments are not limited to this example. The AI system is not limited to the behavior estimation system and furthermore, may include a deep learning model other than the object recognition model and the posture recognition model.

Furthermore, the AI system may also include one or three or more deep learning models. The above-described embodiments have indicated an example in which the accuracy threshold value setting unit 108 generates the threshold value boundary using the multidimensional space with three dimensions (three axes), in correspondence with the two deep learning models included in the AI system. Accordingly, for example, when the AI system includes one deep learning model, the threshold value boundary may be set using a multidimensional space with two dimensions (two axes). In addition, when the AI system includes three or more deep learning models, the threshold value boundary may be set using a multidimensional space with four or more dimensions (four or more axes). Furthermore, the present embodiments may be implemented and manufactured by those skilled in the art according to the disclosure described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an analysis program that causes a computer to execute a process for determining target accuracies for a plurality of deep learning models that constitute an artificial intelligence (AI) system, the process comprising:

creating a plurality of sub-AI systems by combining, for each of the plurality of deep learning models, first snapshot models extracted from a first group and second snapshot models extracted from a second group, the snapshot models in each of the first group and the second group having stepwise different accuracies and being saved during a training course of a respective one of the plurality of deep learning models; and presenting an inference result each of the sub-AI systems to an user;

accepting an evaluation by the user for the inference result, the evaluation being a binary judgment result representing whether or not the inference result is acceptable to the user; and creating, based on the evaluation by the user, accuracy reference information that defines a boundary in a multi-dimensional space, the boundary separating combinations of model accuracies that result in acceptable evaluations from combinations of model accuracies that result in unacceptable evaluations, each dimension of the multi-dimensional space corresponding to an accuracy of one of the plurality of deep learning models.

2. An analysis method that causes a computer to execute a process for determining target accuracies for a plurality of deep learning models that constitute an artificial intelligence (AI) system, the process comprising:

creating a plurality of sub-AI systems by combining, for each of the plurality of deep learning models, first snapshot models extracted from a first group and second snapshot models extracted from a second group, the snapshot models in each of the first group and the second group having stepwise different accuracies and being saved during a training course of a respective one of the plurality of deep learning models; and presenting an inference result each of the sub-AI systems to an user;

accepting an evaluation by the user for the inference result, the evaluation being a binary judgment result representing whether or not the inference result is acceptable to the user; and creating, based on the evaluation by the user, accuracy reference information that defines a boundary in a multi-dimensional space, the boundary separating combinations of model accuracies that result in acceptable evaluations from combinations of model accuracies that result in unacceptable evaluations, each dimension of the multi-dimensional space corresponding to an accuracy of one of the plurality of deep learning models.

3. An information processing device comprising:

a memory; and a processor coupled to the memory and configured to execute a process for determining target accuracies for a plurality of deep learning models that constitute an artificial intelligence (AI) system, the process comprising:

creating a plurality of sub-AI systems by combining, for each of the plurality of deep learning models, first snapshot models extracted from a first group and second snapshot models extracted from a second group, the snapshot models in each of the first group and the second group having stepwise different accuracies and being saved during a training course of a respective one of the plurality of deep learning models;

present an inference result each of the sub-AI systems to an user;

accepting an evaluation by the user for the inference result, the evaluation being a binary judgment result representing whether or not the inference result is acceptable to the user; and creating, based on the evaluation by the user, accuracy reference information that defines a boundary in a multi-dimensional space, the boundary separating combinations of model accuracies that result in acceptable evaluations from combinations of model accuracies that result in unacceptable evaluations, each dimension of the multi-dimensional space corresponding to an accuracy of one of the plurality of deep learning models.

4. The non-transitory computer-readable recording medium of claim 1, wherein the AI system is a behavior estimation system.

5. The non-transitory computer-readable recording medium of claim 1, wherein the process is performed without using label information for test data of the AI system as a whole.

6. The analysis method of claim 2, wherein the AI system is a behavior estimation system.

7. The analysis method of claim 2, wherein the process is performed without using label information for test data of the AI system as a whole.

8. The information processing device of claim 3, wherein the AI system is a behavior estimation system.

9. The information processing device of claim 3, wherein the process further includes creating the accuracy reference information without using label information for test data of the AI system as a whole.

* * * * *